United States Patent
Tao et al.

(10) Patent No.: US 11,196,824 B2
(45) Date of Patent: Dec. 7, 2021

(54) METHOD FOR CONTROLLING FUNCTIONS OF ELECTRONIC DEVICE AND SERVER EMPLOYING THE METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Shuang-Feng Tao, Shenzhen (CN); Chao-Yi Ke, Shenzhen (CN); Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/747,100

(22) Filed: Jan. 20, 2020

(65) Prior Publication Data
US 2021/0044661 A1  Feb. 11, 2021

(30) Foreign Application Priority Data
Aug. 9, 2019  (CN) .......................... 201910735799.1

(51) Int. Cl.
| H04L 29/08 | (2006.01) |
| G06F 3/14 | (2006.01) |
| H04L 29/06 | (2006.01) |
| G06F 9/4401 | (2018.01) |

(52) U.S. Cl.
CPC ................ H04L 67/18 (2013.01); G06F 3/14 (2013.01); G06F 9/442 (2013.01); H04L 67/141 (2013.01); H04L 67/42 (2013.01)

(58) Field of Classification Search
None
See application file for complete search history.

(56) References Cited

U.S. PATENT DOCUMENTS

| 2005/0073443 A1* | 4/2005 | Sheha ................ G01C 21/3697 340/995.1 |
| 2013/0310053 A1* | 11/2013 | Srivastava ............ H04W 4/021 455/446 |
| 2014/0056122 A1* | 2/2014 | Singal ...................... H04L 45/28 370/220 |
| 2015/0181384 A1* | 6/2015 | Mayor .................. H04W 24/02 455/456.1 |
| 2016/0088546 A1* | 3/2016 | Birch ................ G06Q 30/0261 455/456.3 |

(Continued)

Primary Examiner — Scott B Christensen
(74) Attorney, Agent, or Firm — ScienBiziP, P.C.

(57) ABSTRACT

A method for controlling functions of an electronic device by a server includes establishing a communication connection between the server and the electronic device when a distance between the electronic device and the server is less than or equal to a preset value. Positioning information of the electronic device is acquired at every preset time when the electronic device enters a preset control area. A control mode of the electronic device is determined according to positioning information of the electronic device. Once a control signal is generated according to the control mode of the electronic device, status of an image-capturing device, and/or status of a microphone of the electronic device are controlled according to the control signal.

10 Claims, 4 Drawing Sheets

(56) References Cited

U.S. PATENT DOCUMENTS

| | | | |
|---|---|---|---|
| 2016/0094538 A1* | 3/2016 | Dabbiere | H04L 63/105 |
| | | | 726/8 |
| 2016/0358432 A1* | 12/2016 | Branscomb | G08B 13/1965 |
| 2017/0150308 A1* | 5/2017 | Jones | G08G 5/0021 |
| 2019/0149652 A1* | 5/2019 | Rodriguez Bravo | H04W 48/04 |
| | | | 455/418 |

* cited by examiner

METHOD FOR CONTROLLING FUNCTIONS OF ELECTRONIC DEVICE AND SERVER EMPLOYING THE METHOD

CROSS-REFERENCE TO RELATED APPLICATIONS

This application claims priority to CN Application No. 201910735799.1 filed on Aug. 9, 2019, the contents of which are incorporated by reference herein.

FIELD

The subject matter herein generally relates to management technology, and particular to a control method and a server employing the method.

BACKGROUND

Electronic devices are used extensively. Generally, the electronic device has functions of photographing and recording. However, unauthorized persons should not carry the electronic device having the functions of photographing and recording into a designated controlled area, such as new products laboratory or into a confidential business meeting. Therefore, such restrictions may be inconvenient to persons who need to enter the controlled area.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

Figure 1:
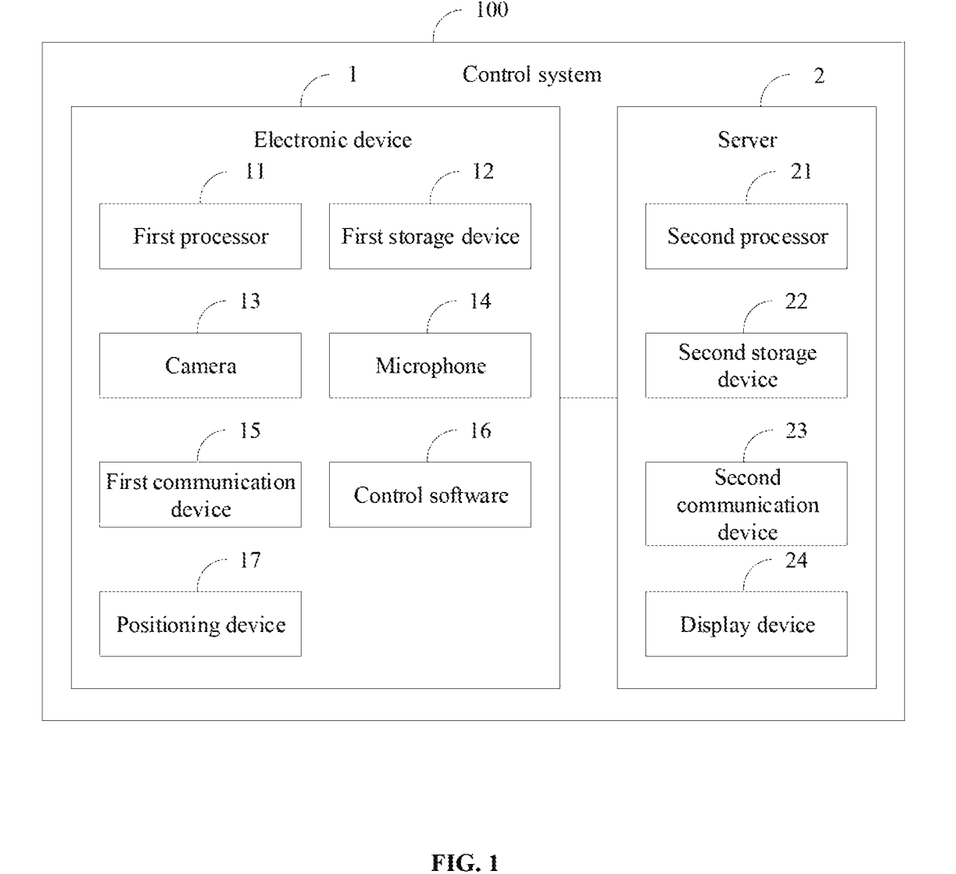
FIG. 1 is a block diagram of one embodiment of a control system.

FIG. 1 illustrates a schematic diagram of a control system 100 for controlling functions of an electronic device. In one embodiment, the control system 100 is run in an environment formed by an electronic device 1 and a server 2. The control system 100 can establish a communication connection between the electronic device 1 and the server 2, so that the server 2 can control an image-capturing function and/or a recording function of the electronic device 1, to ensure information security of a preset control area. The preset control area can be defined to be an area where security information is not allowed to be captured or recorded. For example, the preset control area can be an area such as a room that is used for developing a new product or an area that is used for holding a business meeting for the new product.

In the embodiment, the electronic device 1 is a portable electronic device such as a smart phone, a tablet computer, a smart watch, or any other suitable device. The electronic device 1 includes, but is not limited to, a first processor 11, a first storage device 12, a camera 13, a microphone 14, and a first communication device 15. The first processor 11 can be a micro processing chip.

In at least one exemplary embodiment, the first storage device 12 can be used to store program codes of computer programs and various data. The first storage device 12 can automatically access the computer programs or data. The first storage device 12 can include a read-only memory (ROM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the electronic device 1 that can be used to carry or store data.

In the embodiment, the camera 13 can be used to capture images, and the microphone 14 can be used to record sound. The first communication device 15 is an NFC (Near Field Communication) device, and can be used to exchange data with other devices having functions of NFC.

In one embodiment, the server 2 is disposed at an entrance or an exit of the preset control area. One or more of the servers 2 may be disposed in the preset control area according to requirements. The server 2 includes, but is not limited to, a second processor 21, a second storage device 22, a second communication device 23, and a display device 24. In this embodiment, the second communication device 23 is an NFC device, and can be used to exchange data with other devices having the function of NFC. The display device 24 is an LED (Light-emitting diode) display screen or an LCD (Liquid Crystal Display) display screen for displaying information of the server 2.

Figure 2:
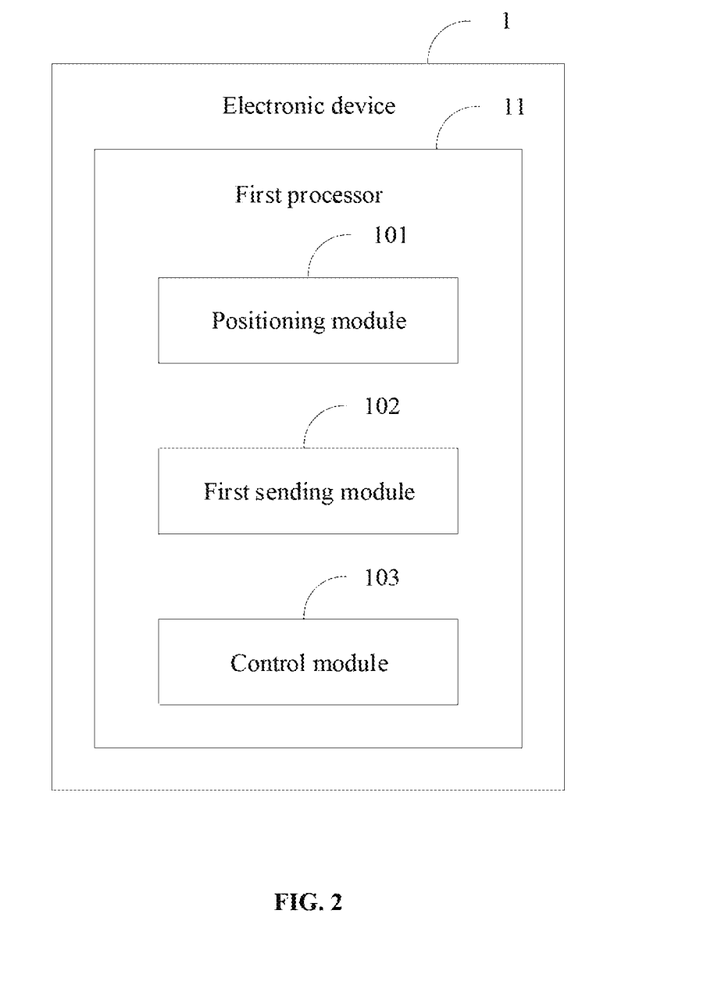
FIG. 2 illustrates a block diagram of modules of an electronic device.
Figure 3:
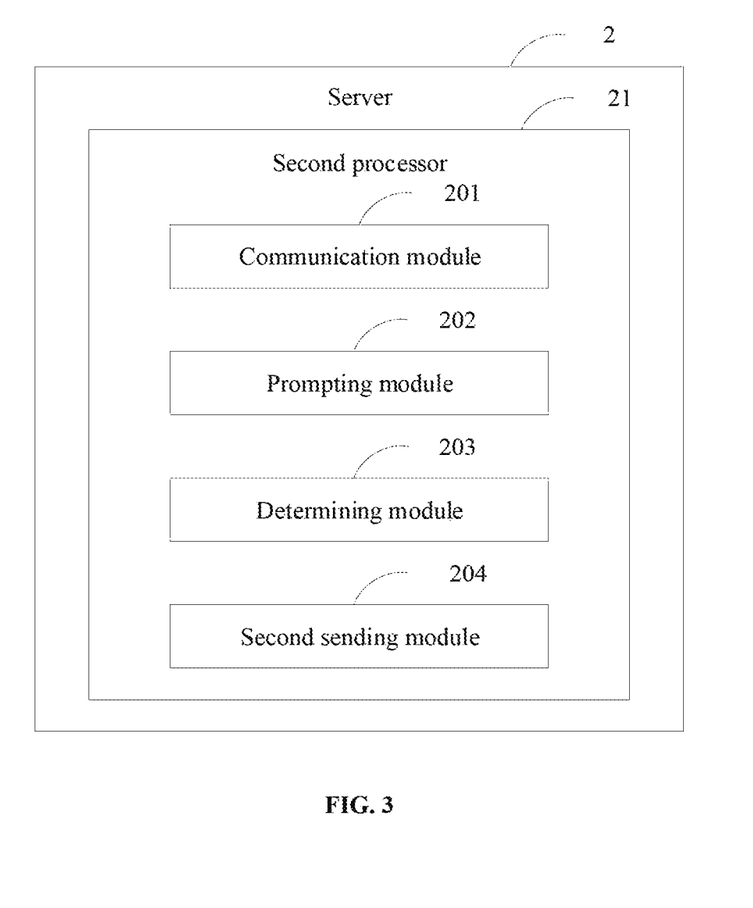
FIG. 3 illustrates a block diagram of modules of a server.

Referring to FIG. 2 and FIG. 3, the control system 100 can include, but is not limited to, a positioning module 101, a first sending module 102, a control module 103, a communication module 201, a prompting module 202, a determining module 203, and a second sending module 204. In this embodiment, the modules 101-103 can include computerized instructions in a form of one or more computer-readable programs that can be stored in a non-transitory computer-readable medium, for example in the first storage device 12, and executed by the first processor 11 of the electronic device 1.

The modules 201-204 can include computerized instructions in a form of one or more computer-readable programs that can be stored in a non-transitory computer-readable medium, for example in the second storage device 22, and executed by the second processor 21 of the server 2.

It can be understood that, in other embodiments, the modules 101-103 can also be computerized instructions or firmware that are solidified in the first processor 11, and the modules 201-204 can also be computerized instructions or firmware that are solidified in the second processor 21.

The communication module 201 can establish a communication connection between the server 2 and the electronic device 1 when a distance between the electronic device 1 and the server 2 is less than or equal to a preset value. In this embodiment, the preset value is 20 centimeters.

Specifically, when a user carries the electronic device 1 and enters the preset control area, and the distance between the electronic device 1 and the server 2 is less than or equal to the preset value, the communication module 201 controls the second communication device 23 to send a control signal to the first communication device 15 of the electronic device 1.

In the embodiment, a control software 16 installed in the electronic device 1 can be used for controlling a status of the camera 13 and controlling a status of the microphone 14. For example, the control software 16 can turn on or turn off the camera 13 and/or the microphone 14. When the first communication device 15 receives the control signal, the electronic device 1 can activate the control software 16, and can turn on or turn off the camera 13 and/or the microphone 14 using the control software 16.

When the control software 16 is successfully activated, the first communication device 15 sends a feedback signal to the second communication device 23, and informs the second communication device 23 that the electronic device 1 has opened a control function.

The communication module 201 further determines whether the second communication device 23 receives the feedback signal within a second preset time. In this embodiment, the second preset time can be defined to be a time period such as five seconds calculated from the sending of the control signal.

In one embodiment, the communication module 201 can establish the communication connection between the server 2 and the electronic device 1 when the second communication device 23 receives the feedback signal within the second preset time. In the embodiment, the communication connection between the server 2 and the electronic device 1 is an NFC communication connection. The NFC communication connection can be defined to be the communication connection under the NFC communication protocol. In other words, the communication connection between the server 2 and the electronic device 1 can be established using the first communication device 15 and the second communication device 23. It should be noted that the electronic device 1 and the server 2 can further establish communication connection between each other using other communication devices such the Bluetooth devices and/or WIFI devices.

When the communication connection between the server 2 and the electronic device 1 is established, the prompting module 202 controls the display device 24 to output a first prompt to remind the user of the server 2 that the electronic device 1 has opened the control function, and the user of the electronic device 1 is allowed to carry the electronic device 1 into the preset control area. In one embodiment, when the user of the electronic device 1 is allowed to carry the electronic device 1 into the preset control area, the prompting module 202 can further send a third prompt to the positioning module 101 of the electronic device 1, that the user of the electronic device 1 is allowed to carry the electronic device 1.

In other embodiments, when the second communication device 23 does not receive the feedback signal within the second preset time, and the communication connection between the server 2 and the electronic device 1 is not established, the prompting module 202 controls the display device 24 to output a second prompt to remind the user of the server 2 that the electronic device 1 cannot be controlled, and the user of the electronic device 1 cannot be allowed to carry the electronic device 1 into the preset control area.

In other embodiments, the prompting module 202 can control the server 2 to output audio information to remind the user of the server 2 that the electronic device 1 is controllable or uncontrollable, i.e., remind the user of the server 2 that the user of the electronic device 1 can be or is not allowed to carry the electronic device 1 into the preset control area.

The positioning module 101 acquires positioning information of the electronic device 1 at every first preset time when the user of the electronic device 1 has been allowed to carry the electronic device 1 into the preset control area. In one embodiment, the positioning module 101 acquires positioning information of the electronic device 1 after the third prompt is received from the server 2. In other embodiments, the electronic device 1 acquires positioning information of the electronic device 1 when the electronic device enters the preset control area.

In the embodiment, the electronic device 1 further includes a positioning device 17. The positioning device 17 can be a GPS (Global Position System) device. When the user of the electronic device 1 has been allowed to carry the electronic device 1 into the preset control area (i.e., when the third prompt is received from the server 2), the positioning module 101 controls the positioning device 17 to acquire the positioning information of the electronic device 1 at every first preset time. In this embodiment, the first preset time is five seconds, and the positioning information is latitude and longitude information, or coordinate information.

The first sending module 102 can send the positioning information of the electronic device 1 to the server 2.

The determining module 203 can determine a control mode of the electronic device 1 according to the positioning information of the electronic device 1.

In this embodiment, the preset control area includes a plurality of sub-areas. Each of the plurality of sub-areas corresponds to one of a plurality of modes. The plurality of modes include a first mode that the camera 13 and the microphone 14 of the electronic device 1 should be turned off, a second mode that the camera 13 can be turned on and the microphone 14 should be turned off, a third mode that the camera 13 should be turned off and the microphone 14 can be turned on, and a fourth mode that the camera 13 and the microphone 14 are both should be turned on.

In this embodiment, the determining of the control mode of the electronic device 1 according to the positioning information of the electronic device 1 includes:

determining one sub-area from the plurality of sub-areas according to the positioning information of the electronic device 1, the determined sub-area being an area in which the electronic device 1 located; and determining one mode of the plurality of modes which is corresponding to the determined sub-area as the control mode of the electronic device 1.

For example, it is assumed that the plurality of sub-areas includes a first sub-area used as a production workshop, and a second sub-area used as a remote conference room, and a third sub-area used as a video conference room. When the determining module 203 determines that the electronic device 1 is in the first sub-area according to the positioning information of the electronic device 1, and the third mode corresponds to the first sub-area, the determining module 203 determines that the control mode of the electronic device 1 is the third mode, i.e., the camera 13 should be turned off and the microphone 14 can be turned on. For another example, when the determining module 203 determines that the electronic device 1 is in the second sub-area according to the positioning information of the electronic device 1, and the second mode corresponds to the second sub-area, the determining module 203 determines that the control mode of the electronic device 1 is the second mode, i.e., the camera 13 can be turned on but the microphone 14 should be closed. For a third example, when the determining module 203 determines that the electronic device 1 is in the third sub-area according to the positioning information of the electronic device 1, and the first mode corresponds to the third sub-area, the determining module 203 determines that the control mode of the electronic device 1 is first mode, i.e., both the camera 13 and the microphone 14 should be turned off.

The second sending module 204 can generate a control signal according to the control mode of the electronic device 1, and can send the control signal to the electronic device 1.

The control module 103 can control the electronic device 1 to turn on or turn off the camera 13, and/or turn on or turn off the microphone 14 according to the control signal. In one embodiment, the control module 103 can invoke the control software 16 to turn on or turn off the camera 13, and/or turn on or turn of the microphone 14 according to the control signal.

In this embodiment, the control signal includes information of the control mode, and the control module 103 controls the electronic device 1 to turn on or turn off the camera 13, and/or turn on or turn of the microphone 14 according to the control mode included in the control signal.

For example, when the control mode included in the control signal is the third mode, i.e., the camera 13 should be turned off and the microphone 14 can be turned on, the control module 103 controls the electronic device 1 to turn off the camera 13.

It should be noted that, the control mode of the electronic device 1 may be changed because the sub-area where the electronic device 1 is located has changed. In at least one embodiment, the determining module 203 further determines whether the control mode of the electronic device 1 is changed. When the control mode of the electronic device 1 is changed from one of the plurality of models to another mode of the plurality of modes, the second sending module 204 can generate another control signal according to the another mode of the plurality of modes, and can send the another control signal to the electronic device 1. Accordingly, the control module 103 updates a status of the camera 13 and a status of the microphone 14 according to the another mode included in another control signal.

When the user of the electronic device 1 leaves the preset control area, the electronic device 1 needs to be brought close to the server 2 again, so that the distance between the electronic device 1 and the server 2 is less than or equal to the preset value. The communication module 201 controls the second communication device 23 to send a shutdown signal to the first communication device 15 when the distance between the electronic device 1 and the server 2 is less than or equal to the preset value.

When the first communication device 15 receives the shutdown signal, the control module 103 inactivates the control software 16 so as to close the control function, and the first communication device 15 sends a feedback signal that the control function is closed to the second communication device 23.

When the second communication device 23 receives the feedback signal that the control function is closed, the prompting module 202 further controls the display device 24 to output a fourth prompt to prompt the user of the server 2 that the control function of electronic device 1 has been turned off, and the capture function and recording function of the electronic device 1 is no longer restricted, and the user of the electronic device 1 can leave the preset control area.

Figure 4:
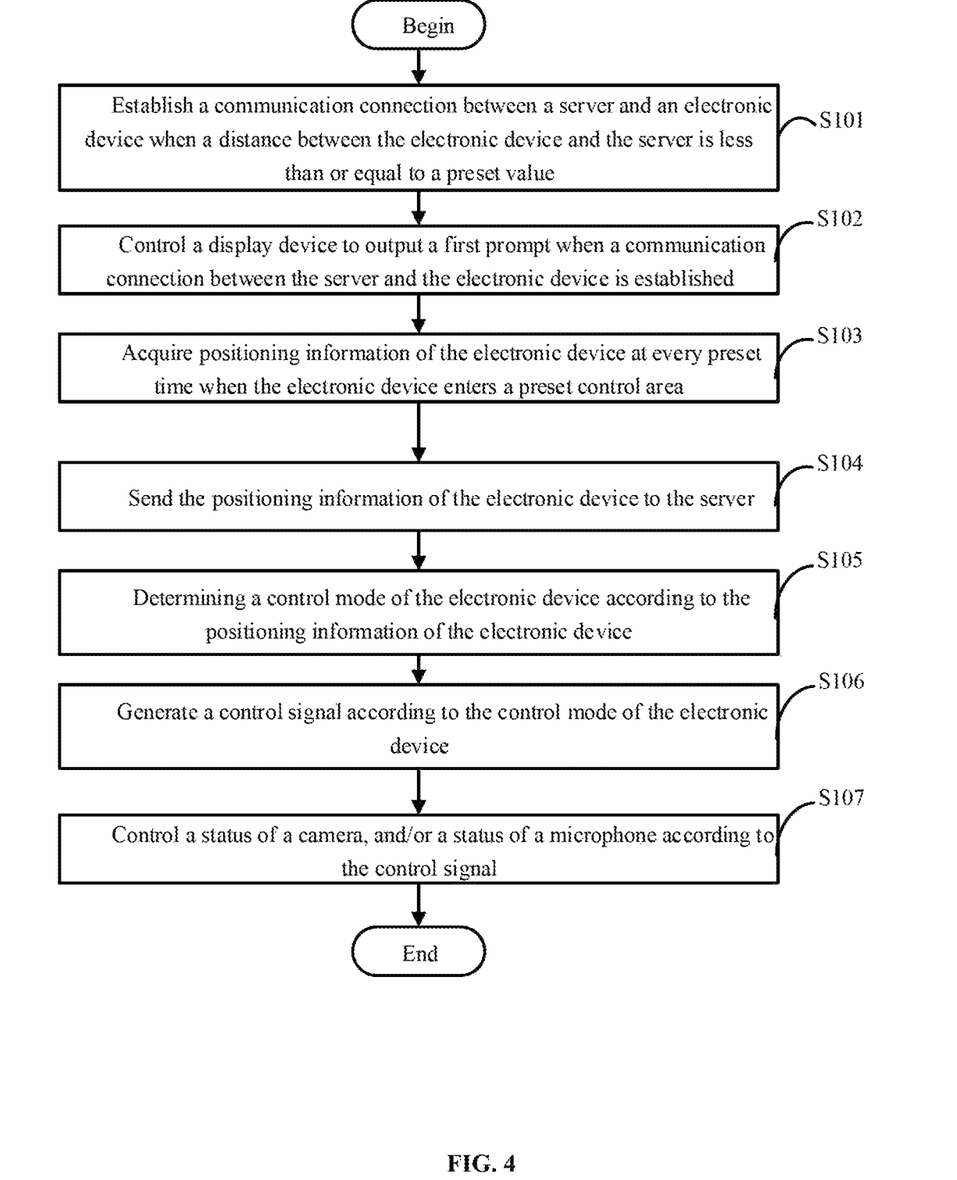
FIG. 4 illustrates a flowchart of one embodiment of a control method using the control system of FIG. 1.

FIG. 4 illustrates a flowchart of one embodiment of a control method of controlling the electronic device 1. In an example embodiment, the method is performed by execution of computer-readable software program codes or instructions by the first processor 11 of the electronic device 1 and the second processor 21 of the server 2.

Referring to FIG. 4, a method is provided by way of example, as there are a variety of ways to carry out the method. The method described below can be carried out using the configurations illustrated in FIG. 1, for example, and various elements of these figures are referenced in explaining method. Each block shown in FIG. 4 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S101.

At block S101, the server 2 can establish a communication connection with the electronic device 1 when a distance between the electronic device 1 and the server 2 is less than or equal to a preset value. In this embodiment, the preset vale is 20 centimeters.

Specifically, when a user of the electronic device 1 carries the electronic device 1 and enters the preset control area, and the distance between the electronic device 1 and the server 2 is less than or equal to the preset value, the server 2 controls the second communication device 23 to send a control signal to the first communication device 15 of the electronic device 1.

In the embodiment, a control software 16 installed in the electronic device 1 can be used for controlling a status of the camera 13 and controlling a status of the microphone 14. For example, the control software 16 can turn on or turn off the camera 13 and/or the microphone 14. When the first communication device 15 receives the control signal, the electronic device 1 can activate the control software 16, and can turn on or turn off the camera 13 and/or the microphone 14 using the control software 16.

When the control software 16 is successfully activated, the first communication device 15 sends a feedback signal to the second communication device 23, and informs the second communication device 23 that the electronic device 1 has opened a control function.

The server 2 further determines whether the second communication device 23 receives the feedback signal within a second preset time. In this embodiment, the second preset time can be defined to be a time period such as five seconds calculated from the sending of the control signal.

In one embodiment, the server 2 can establish the communication connection with the electronic device 1 when the second communication device 23 receives the feedback signal within the second preset time. In the embodiment, the communication connection between the server 2 and the electronic device 1 is an NFC communication connection. The NFC communication connection can be defined to be the communication connection under the NFC communication protocol. In other words, the communication connection between the server 2 and the electronic device 1 can be established using the first communication device 15 and the second communication device 23. It should be noted that the electronic device 1 and the server 2 can further establish communication connection between each other using other communication devices such the BLUETOOTH devices and/or WIFI devices.

At block S102, when the communication connection between the server 2 and the electronic device 1 is established, the server 2 controls the display device 24 to output a first prompt to remind the user of the server 2 that the electronic device 1 has opened the control function, and the user of the electronic device 1 is allowed to carry the electronic device 1 into the preset control area. In one embodiment, when the user of the electronic device 1 is allowed to carry the electronic device 1 into the preset control area, the server 2 can further send a third prompt to the electronic device 1, that the user of the electronic device 1 is allowed to carry the electronic device 1.

In other embodiments, when the second communication device 23 does not receive the feedback signal within the second preset time, and the communication connection between the server 2 and the electronic device 1 is not established, the server 2 controls the display device 24 to output a second prompt to remind the user of the server 2 that the electronic device 1 cannot be controlled, and the user of the electronic device 1 is not allowed to carry the electronic device 1 into the preset control area.

In other embodiments, the server 2 can output audio information to remind the user of the server 2 that the electronic device 1 is controllable or uncontrollable, i.e., remind the user of the server 2 that the user of the electronic device 1 can be or is not allowed to carry the electronic device 1 into the preset control area.

At block S103, the electronic device 1 acquires positioning information of the electronic device 1 at every first preset time when the user of the electronic device 1 has been allowed to carry the electronic device 1 into the preset control area. In one embodiment, the electronic device 1 acquires positioning information of the electronic device 1 when the third prompt is received from the server 2. In other embodiments, the electronic device 1 acquires positioning information of the electronic device 1 when the electronic device enters the preset control area.

In the embodiment, the electronic device 1 further includes a positioning device 17. The positioning device 17 can be a GPS (Global Position System) device. When the user of the electronic device 1 has been allowed to carry the electronic device 1 into the preset control area (i.e., when the third prompt is received from the server 2), the electronic device 1 controls the positioning device 17 to acquire the positioning information of the electronic device 1 at every first preset time. In this embodiment, the first preset time is five seconds, and the positioning information is latitude and longitude information, or coordinate information.

At block S104, the electronic device 1 can send the positioning information of the electronic device 1 to the server 2.

At block S105, the server 2 can receive the positioning information of the electronic device 1 and can determine a control mode of the electronic device 1 according to the positioning information of the electronic device 1.

In this embodiment, the preset control area includes a plurality of sub-areas. Each of the plurality of sub-areas corresponds to one of a plurality of modes. The plurality of modes include a first mode that the camera 13 and the microphone 14 of the electronic device 1 should be turned off, a second mode that the camera 13 can be turned on and the microphone 14 should be turned off, a third mode that the camera 13 should be turned off and the microphone 14 can be turned on, and a fourth mode that the camera 13 and the microphone 14 are both should be turned on.

In this embodiment, the determining of the control mode of the electronic device 1 according to the positioning information of the electronic device 1 includes:

determining one sub-area from the plurality of sub-areas according to the positioning information of the electronic device 1, the determined sub-area being an area in which the electronic device 1 is located; and determining one mode of the plurality of modes which is corresponding to the determined sub-area as the control mode of the electronic device 1.

For example, it is assumed that the plurality of sub-areas includes a first sub-area used as a production workshop, and a second sub-area used as a remote conference room, and a third sub-area used as a video conference room. When the server 2 determines that the electronic device 1 is in the first sub-area according to the positioning information of the electronic device 1, and the third mode corresponds to the first sub-area, the server 2 determines that the control mode of the electronic device 1 is the third mode, i.e., the camera 13 should be turned off and the microphone 14 can be turned on. For another example, when the server 2 determines that the electronic device 1 is in the second sub-area according to the positioning information of the electronic device 1, and the second mode corresponds to the second sub-area, the server 2 determines that the control mode of the electronic device 1 is the second mode, i.e., the camera 13 can be turned on but the microphone 14 should be closed. For a third example, when the server 2 determines that the electronic device 1 is in the third sub-area according to the positioning information of the electronic device 1, and the first mode corresponds to the third sub-area, the server 2 determines that the control mode of the electronic device 1 is first mode, i.e., both the camera 13 and the microphone 14 should be turned off.

At block S106, the server 2 can generate a control signal according to the control mode of the electronic device 1, and can send the control signal to the electronic device 1.

At block S107, the electronic device 1 can turn on or turn off the camera 13, and/or turn on or turn off the microphone 14 according to the control signal. In one embodiment, the electronic device 1 can turn on or turn off the camera 13, and/or turn on or turn of the microphone 14 according to the control signal via the control software 16.

In this embodiment, the control signal includes information of the control mode, and the electronic device 1 turn on or turn off the camera 13, and/or turn on or turn of the microphone 14 according to the control mode included in the control signal.

For example, when the control mode included in the control signal is the third mode, i.e., the camera 13 should be turned off and the microphone 14 can be turned on, the electronic device 1 turns off the camera 13.

It should be noted that, the control mode of the electronic device 1 may be changed because the sub-area where the electronic device 1 located changed. In at least one embodiment, the server 2 further determines whether the control mode of the electronic device 1 is changed. When the control mode of the electronic device 1 is changed from one of the plurality of models to another mode of the plurality of modes, the server 2 can generate another control signal according to the another mode of the plurality of modes, and can send the another control signal to the electronic device 1. Accordingly, the electronic device 1 updates a status of the camera 13 and a status of the microphone 14 according to the another mode included in another control signal.

When the user of the electronic device 1 leaves the preset control area, the electronic device 1 needs to be brought close to the server 2 again, so that the distance between the electronic device 1 and the server 2 is less than or equal to the preset value. The server 2 controls the second communication device 23 to send a shutdown signal to the first communication device 15 when the distance between the electronic device 1 and the server 2 is less than or equal to the preset value.

When the first communication device 15 receives the shutdown signal, the electronic device 1 inactivates the control software 16 so as to close the control function, and the first communication device 15 sends a feedback signal that the control function is closed to the second communication device 23.

When the second communication device 23 receives the feedback signal that the control function is closed, the server 2 further controls the display device 24 to output a fourth prompt to prompt the user of the server 2 that the control function of electronic device 1 has been turned off, and the capture function and recording function of the electronic device 1 is no longer limited, and the user of the electronic device 1 can leave the preset control area.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. A controlling method applied to a server and an electronic device, the electronic device comprising a camera and a microphone, the method comprising:
   establishing a communication connection between the server and the electronic device when a distance between the electronic device and the server is less than or equal to a preset value;
   responsive to establishing the communication connection, acquiring positioning information of the electronic device at every preset time interval when the electronic device enters a preset control area, wherein the preset control area includes locations at a distance greater than the preset value such that the positioning information is acquired even when the distance is greater than the preset value;
   sending, by the electronic device, the positioning information of the electronic device to the server at every preset time interval;
   determining, by the server, a control mode of the electronic device according to the positioning information of the electronic device;
   generating, by the server, a control signal according to the control mode of the electronic device and sending the control signal to the electronic device;
   activating, by the electronic device, a control software installed in the electronic device in response to the control signal so as to open a control function to restrict use of the electronic device;
   controlling, by the electronic device, a status of the camera, and/or a status of the microphone according to the control signal using the control software;
   sending, by the control server, a shutdown signal to the electronic device when the distance between the electronic device and the server is less than or equal to the preset value; and
   inactivating, by the electronic device, the control software in response to the shutdown signal so as to close the control function such that use of the electronic device is no longer restricted.

2. The method according to claim 1, wherein the electronic device further comprises a first communication device, and the server comprises a second communication device, the method further comprises:
   sending the control signal to the first communication device from the second communication device;
   determining whether the second communication device receives a feedback signal from the first communication device within a preset time period; and
   establishing the communication connection between the server and the electronic device when the second communication device receives the feedback signal within the preset time period.

3. The method according to claim 2, wherein the server further comprises a display device, and the method further comprises:
   outputting a first prompt using the display device when the communication connection between the server and the electronic device is established; and
   outputting a second prompt using the display device when the second communication device does not receive the feedback signal within the preset time period.

4. The method according to claim 1, wherein the determining of the control mode of the electronic device according to the positioning information of the electronic device comprises:
   determining one sub-area from a plurality of sub-areas according to the positioning information of the electronic device, the determined sub-area being an area in which the electronic device located; and
   determining one mode of a plurality of modes which is corresponding to the determined sub-area as the control mode of the electronic device.

5. The method according to claim 4, wherein the plurality of modes comprises a first mode that the camera and the microphone of the electronic device should be turned off, a second mode that the camera can be turned on and the microphone should be turned off, a third mode that the camera should be turned off and the microphone can be turned on, and a fourth mode that the camera and the microphone are both should be turned on.

6. A non-transitory storage medium having stored thereon instructions that, when executed by a processor of an electronic device comprising a camera and a microphone and by a processor of a server, the electronic device and the server are instructed to:

establish a communication connection between the server and the electronic device when a distance between the electronic device and the server is less than or equal to a preset value;

responsive to establishing the communication connection, acquire positioning information of the electronic device at every preset time interval when the electronic device enters a preset control area, wherein the preset control area includes locations at a distance greater than the preset value such that the positioning information is acquired even when the distance is greater than the preset value;

send, by the electronic device, the positioning information of the electronic device to the server at every preset time interval;

determine, by the server, a control mode of the electronic device according to the positioning information of the electronic device;

generate, by the server, a control signal according to the control mode of the electronic device and sending the control signal to the electronic device;

activate, by the electronic device, a control software installed in the electronic device in response to the control signal so as to open a control function to restrict use of the electronic device;

control, by the electronic device, a status of the camera, and/or a status of the microphone according to the control signal using the control software;

send, by the control server, a shutdown signal to the electronic device when the distance between the electronic device and the server is less than or equal to the preset value; and inactivate, by the electronic device, the control software in response to the shutdown signal so as to close the control function such that use of the electronic device is no longer restricted.

7. The non-transitory storage medium according to claim 6, wherein the electronic device further comprises a first communication device, and the server comprises a second communication device, the electronic device and the server are further instructed to:

send the control signal to the first communication device from the second communication device;

determine whether the second communication device receives a feedback signal from the first communication device within a preset time period; and establish the communication connection between the server and the electronic device when the second communication device receives the feedback signal within the preset time period.

8. The non-transitory storage medium according to claim 7, wherein the server further comprises a display device, and the electronic device and the server are further instructed to:

output a first prompt using the display device when the communication connection between the server and the electronic device is established; and output a second prompt using the display device when the second communication device does not receive the feedback signal within the preset time period.

9. The non-transitory storage medium according to claim 6, wherein the server is instructed to determine the control mode of the electronic device according to the positioning information of the electronic device by:

determining one sub-area from a plurality of sub-areas according to the positioning information of the electronic device, the determined sub-area being an area in which the electronic device located; and determining one mode of a plurality of modes which is corresponding to the determined sub-area as the control mode of the electronic device.

10. The non-transitory storage medium according to claim 9, wherein the plurality of modes comprises a first mode that the camera and the microphone of the electronic device should be turned off, a second mode that the camera can be turned on and the microphone should be turned off, a third mode that the camera should be turned off and the microphone can be turned on, and a fourth mode that the camera and the microphone are both should be turned on.

* * * * *